E. L. NOLAN.
GARDEN TOOL.
APPLICATION FILED MAR. 29, 1913.
1,082,040.
Patented Dec. 23, 1913.
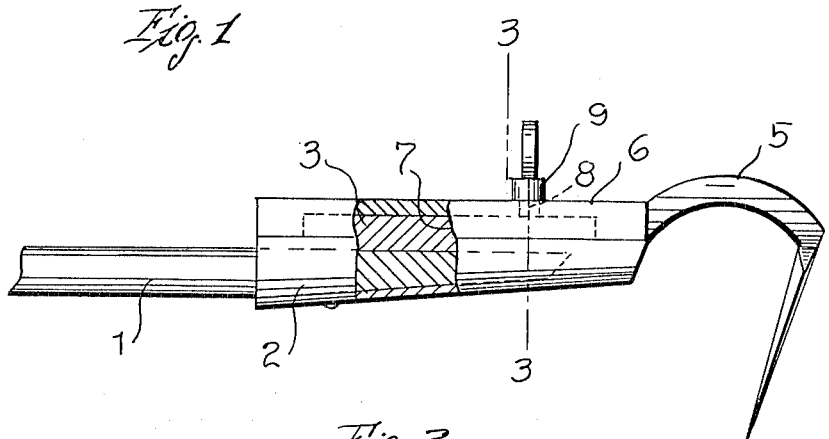
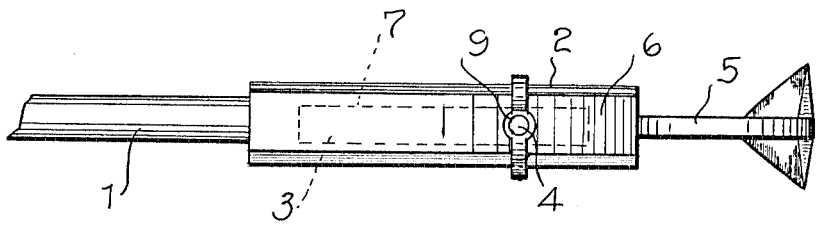
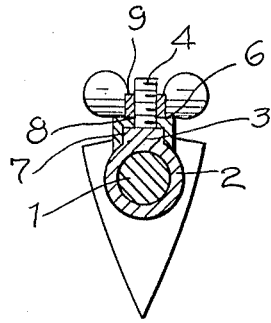
Inventor
ELMER L. NOLAN.
Witnesses
Robert M. Sutphend.
A. I. Hind.
By Watson E. Coleman
Attorney

UNITED STATES PATENT OFFICE.

ELMER L. NOLAN, OF ELKHART, INDIANA.

GARDEN-TOOL.

1,082,040.  Specification of Letters Patent.  Patented Dec. 23, 1913.

Application filed March 29, 1913. Serial No. 757,679.

*To all whom it may concern:*

Be it known that I, ELMER L. NOLAN, a citizen of the United States, residing at Elkhart, in the county of Elkhart and State of Indiana, have invented certain new and useful Improvements in Garden-Tools, of which the following is a specification, reference being had to the accompanying drawings.

This invention relates to new and useful improvements in garden tools, and more particularly to that class of implements in which a handle may be interchangeably used with a plurality of tools which are provided with an especially constructed shank.

An object of this invention is the provision of a device of this character, comprising a handle and a handle socket, the socket being constructed so that it may be connected to any one of a plurality of garden tools.

A further object of this invention is the provision of a handle provided with a handle socket, the socket being formed with a longitudinal rib and an upstanding threaded stem projecting from said rib, and each of the tools used in connection with the handle being formed with a shank having a longitudinal groove therein for engagement with said rib and an opening for engagement with the stem, and a winged nut adapted for engagement with the upstanding stem to clamp the shank of the tool to the socket.

With these and other objects in view, my invention consists in certain novel constructions, combinations and arrangements of parts, to be hereinafter more fully described, claimed and illustrated in the accompanying drawing, in which—

Figure 1 is a side elevation of my device partly in section; Fig. 2 is a top plan view; and Fig. 3 is a section on the line 3—3 of Fig. 1.

Referring more particularly to the drawing, the numeral 1 designates a handle which is adapted for use in connection with a garden tool or implement of any character desired. Connected to one end of the handle is a handle socket 2 which is secured to the handle in any desired manner, the upper face of the socket being formed with a longitudinally extending rib 3 which terminates short of the ends of the socket, and projecting upwardly from the ribs 3 is a threaded stem 4.

5 is the blade of the garden tool which is in this instance illustrated as a hoe, the blade being provided with an integral shank 6 which is formed in its lower face intermediate of its ends with a longitudinally extending groove 7. The shank is also provided with an opening 8 registering with the groove 7.

In the practical use of my device, the tool which is desired for use and which is provided with a shank of the construction heretofore described, is engaged with the socket 2 of the handle so that the stem 4 is passed through the opening 8 in the shank, and the groove 7 is engaged with the rib 3 thereof. It will be seen that the end walls and the side walls of the groove 7 prevent lateral or longitudinal movement of the tool with relation to the handle, to securely clamp the shank of the tool to the handle, a winged nut 9 is threaded on the upstanding stem 4 to bear against the upper face of the shank 6, whereby the several parts of the device are rigidly held in position.

From the above description taken in connection with the accompanying drawing, it will be apparent that I have provided a simple and efficient garden tool, in which any one of a plurality of tools may be readily secured to or detached from a single handle, and one which consists of a minimum number of parts, and which may therefore be cheaply manufactured and readily assembled.

Having thus fully described my invention what I desire to claim and secure by Letters Patent is:

1. An implement comprising a handle having a socket at one end, said socket being formed with a longitudinal rib intermediate of its ends, a tool provided with a shank having a longitudinal groove intermediate of its ends for engagement with said rib, and means for securing said shank to said socket, as and for the purpose described.

2. An implement comprising a handle having a socket at one end, a longitudinal rib on said socket, an upstanding stem projecting from said rib, and a tool having a shank provided with a longitudinal groove for engagement with said rib, said shank being also provided with an opening for engagement with said stem, and means adapted for engagement with said stem for securing said shank to said socket, as and for the purpose described.

3. An implement comprising a handle-socket, said socket being provided with a longitudinal rib, an upstanding threaded stem projecting from said rib, and a tool having a shank provided with a longitudinal groove for engagement with said rib, said shank being also provided with an opening to receive said stem, and a nut adapted for threaded engagement with said threaded stem to bear against said shank, as and for the purpose described.

4. An implement comprising a handle having a socket at one end, said socket being formed with a longitudinal rib terminating short of its ends, an upstanding threaded stem projecting from said rib, a tool having a shank provided with a longitudinal groove intermediate of its ends, said groove being substantially the length of said rib, said shank being also provided with an opening adapted to engage said stem, and means connected to said stem for clamping said shank to said socket, as and for the purpose described.

In testimony whereof I hereunto affix my signature in the presence of two witnesses.

ELMER L. NOLAN.

Witnesses:
GEO. F. BROWNELL,
J. S. FISCHER.

---

Copies of this patent may be obtained for five cents each, by addressing the "Commissioner of Patents, Washington, D. C."